United States Patent
Chang et al.

(10) Patent No.: US 12,513,174 B2
(45) Date of Patent: Dec. 30, 2025

(54) METHOD AND DEVICE FOR ANOMALY DETECTION USING N-GRAM SUBJECT TUPLES

(71) Applicant: TXONE NETWORKS INC., Hsinchu (TW)

(72) Inventors: Min-Hsin Chang, Hsinchu (TW); Han-Chang Liang, Hsinchu (TW); Chung-Lun Cheng, Hsinchu (TW); Tzu-Chun Luo, Hsinchu (TW)

(73) Assignee: TXONE NETWORKS INC., Hsinchu (TW)

( * ) Notice: Subject to any disclaimer, the term of this patent is extended or adjusted under 35 U.S.C. 154(b) by 130 days.

(21) Appl. No.: 18/418,872

(22) Filed: Jan. 22, 2024

(65) Prior Publication Data
US 2025/0240314 A1 Jul. 24, 2025

(51) Int. Cl.
*H04L 29/06* (2006.01)
*H04L 9/40* (2022.01)
*H04L 41/16* (2022.01)

(52) U.S. Cl.
CPC .......... *H04L 63/1425* (2013.01); *H04L 41/16* (2013.01)

(58) Field of Classification Search
CPC .............................. H04L 63/1425; H04L 41/16
See application file for complete search history.

(56) References Cited

U.S. PATENT DOCUMENTS

| | | | | |
|---|---|---|---|---|
| 2013/0081141 | A1* | 3/2013 | Anurag | G06F 21/554 726/23 |
| 2015/0244780 | A1* | 8/2015 | Parashar | H04L 67/145 709/201 |
| 2018/0212985 | A1* | 7/2018 | Zadeh | H04L 63/1425 |
| 2018/0212986 | A1* | 7/2018 | Shen | H04B 1/38 |
| 2019/0268361 | A1* | 8/2019 | Blewett | G06F 21/57 |
| 2022/0100857 | A1* | 3/2022 | Filar | G06N 5/01 |
| 2024/0305655 | A1* | 9/2024 | Liu | H04L 41/0631 |

FOREIGN PATENT DOCUMENTS

CN 108256318 A 7/2018

OTHER PUBLICATIONS

Search Report dated Jun. 27, 2024 of the corresponding European patent application No. 24153557.4.
Office Action dated Oct. 4, 2024 of the corresponding Taiwan patent application No. 112140871.

* cited by examiner

*Primary Examiner* — Ka Shan Choy
(74) *Attorney, Agent, or Firm* — HDLS IPR SERVICES; Chun-Ming Shih

(57) ABSTRACT

An anomaly detection method incorporated with an anomaly detection device running an operating system is disclosed and includes steps of: storing a parent-child relationship upon a process creation; retrieving every upper layer parent-child relationship relating to a parent process; creating a process chain according to the parent-child relationship and every upper layer parent-child relationship relating to the parent process; dividing the process chain into M N-gram subject tuples; and examining an odd of each of the N-gram subject tuples by inquiring a prevalence model and determining whether a creation of a process is an anomaly event according to the odd.

7 Claims, 6 Drawing Sheets

METHOD AND DEVICE FOR ANOMALY DETECTION USING N-GRAM SUBJECT TUPLES

BACKGROUND OF THE DISCLOSURE

Technical Field

The disclosure generally relates to a detection device and a detection method, and more particularly to an anomaly detection device and an anomaly detection method for detecting whether any anomaly event exists in a running environment

Description of Related Art

Computer systems are capable of executing various software to achieve specific functions. Based on different task requirements, users can choose commercial software or open-source software (OSS) to be installed on their computer systems. In general, users are usually concerned with whether the computer system can correctly execute the software functions, while only paying a little attention to the execution proceedings of the software program. Furthermore, users confirm or seek assistance with the software program's execution proceedings only when functionality issues arise. Particularly, commercial software developers do not publicize their source code, aiming to protect the intellectual property of the software and safeguard it from potential damage due to user's wrong operations.

No matter whether commercial software or open-source software is susceptible to software vulnerabilities, leading to the exploitation of these vulnerabilities by malicious software to implant malicious programs (e.g., ransomware). These features are called Arbitrary Code Execution (ACE) vulnerabilities.

To address such cybersecurity events, traditional anomaly detection techniques primarily rely on the analysis of log files. During the operation of a computer system, programs record all activities or events in log files as trace messages for program executions, such as information about errors occurred during the operation. Security personnel or computer systems can determine the possibility of anomaly events by analyzing the activity or event information in log files. For example, security personnel can configure multiple rules in advance for judging anomaly events. When the information in the log file matches the rules for anomaly events, the computer system sends alert information to notify the security personnel.

However, the malicious software implanted through ACE vulnerabilities typically attempts to conceal its activities and does not actively generate log information. Some malicious software may try to erase log information, making it difficult for traditional anomaly detection techniques relying on the log file analysis to detect the occurrence of ACE vulnerabilities. Particularly, traditional anomaly detection techniques that detect malicious software based on the log file analysis are unable to send alerts until the malicious attacks affect the system operations and the log information about anomaly events is generated thereafter. Because there is often a time difference and location difference between the anomaly event records in the log information and the actual occurrence of the anomaly events due to ACE vulnerabilities, it is necessary for experts to spend much time analyzing the log files to trace the source of the anomaly events.

Efficiently managing and analyzing log files is a significant challenge that depends on the high-level expertise and crisis awareness of security personnel. In addition, log file information must be analyzed in real-time to effectively prevent damage, but a large amount of log file information and the configuration of abnormal rules affect the detection of anomaly events. In practice, achieving real-time analysis of log files to discover anomaly events poses a considerable difficulty.

Therefore, how to reduce the complexity of detecting anomaly events and instantly detect the occurrence of anomaly events are the focused technical issues.

SUMMARY OF THE DISCLOSURE

One of the embodiments of the disclosure provides an anomaly detection method executed by an anomaly detection device running an operating system, performed in a detection mode of the anomaly detection device including steps of (a) storing a parent-child relationship upon a process creation; (b) retrieving all upper layer parent-child relationships relating to a parent process; (c) creating a process chain according to the parent-child relationship and all of the upper layer parent-child relationships relating to the parent process; (d) dividing the process chain into M N-gram subject tuples, where each of the N-gram subject tuples includes a process relationship of N subjects, N is a positive integer that is greater than or equal to 2, and M is a positive integer that is greater than or equal to 1; and (e) examining an odd of each of the N-gram subject tuples by inquiring a prevalence model and determining whether a creation of a process belongs to an anomaly event according to the odds, where the prevalence model stores the M N-subject tuples and a prevalence value of each of the N-subject tuples.

One of the embodiments of the disclosure provides an anomaly detection device including a storage medium and a processor. The storage medium is configured to store multiple program codes. The processor is connected to the storage medium and configured to load and execute the multiple program codes to perform operations including: (a) storing a parent-child relationship upon a process creation; (b) retrieving all upper layer parent-child relationships relating to a parent process; (c) creating a process chain according to the parent-child relationship and all of the upper layer parent-child relationships relating to the parent process; (d) dividing the process chain into M N-gram subject tuples, where each of the N-gram subject tuples includes a process relationship of N subjects, N is a positive integer that is greater than or equal to 2, and M is a positive integer that is greater than or equal to 1; and (e) examining an odd of each of the N-gram subject tuples by inquiring a prevalence model and determining whether a creation of a process belongs to an anomaly event according to the odds, where the prevalence model stores the M N-subject tuples and a prevalence value of each of the N-subject tuples.

Instead of parsing a large number of log files to determine whether the malicious programs exist, the disclosure accomplishes the detection of anomaly events by using the prevalence model, achieves the efficiency of identifying anomaly events, and saves computational resources.

DETAILED DESCRIPTION

Figure 1:
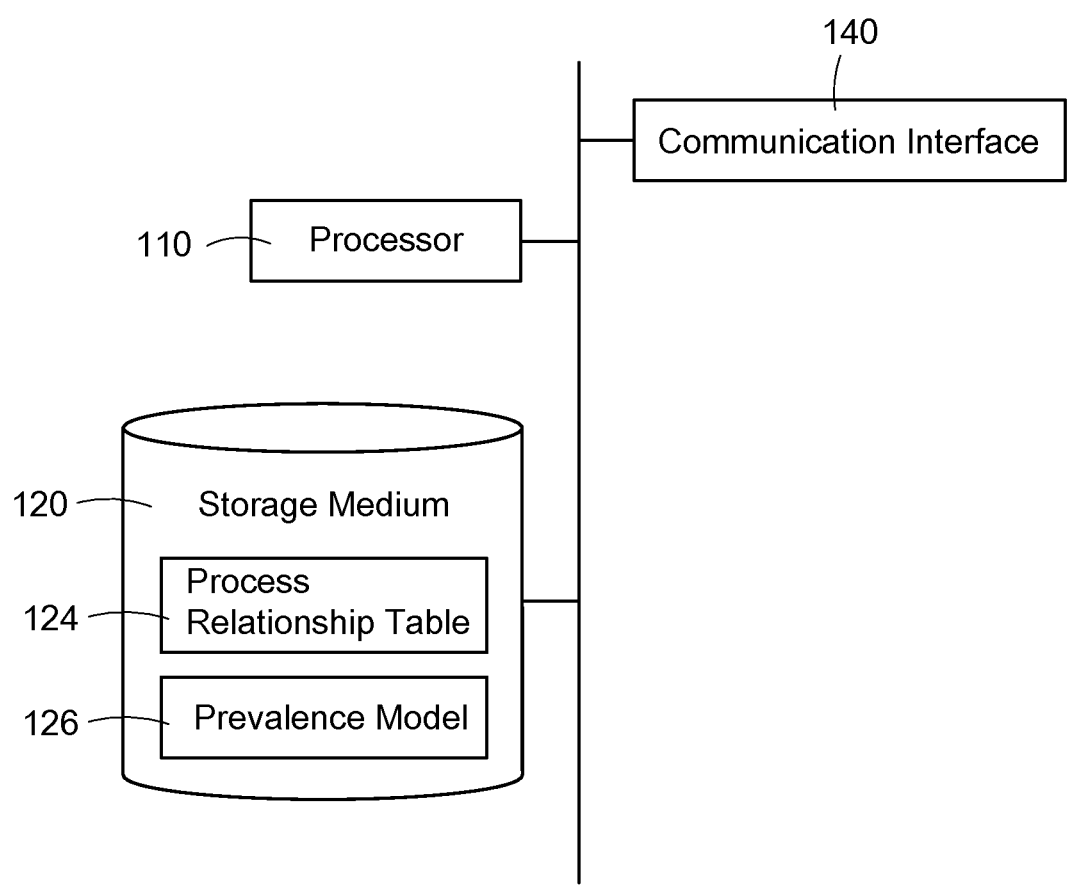
FIG. 1 is a block diagram for illustrating an anomaly detection device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

[Embodiment of an Anomaly Detection Device]

FIG. 1 is a block diagram for illustrating an anomaly detection device according to an embodiment of the disclosure. In an embodiment, the anomaly detection device 100 may be a laptop computer, a personal computer, an Internet of Things (IoT) device, a server, or an electronic device operating an operation system after being switched on.

In an embodiment, the anomaly detection device 100 may retrieve information about all running processes from an operation system hook that the processes are created, including the information about the process (i.e., a child process) and a parent process creating the child process. The created child process may create another process, and the parent process may have another upper layer parent process. The behavior above is called "process creation" herein. The anomaly detection device 100 continuously retrieves a process creation relationship upon the process creation and a process call relationship among multiple processes and stores the relationships to a process relationship table 124.

In an embodiment, the anomaly detection device 100 may call a specific tool library (such as Tool Help Library provided by Microsoft®) and retrieve the information about all running processes (including the created process and the parent process creating the process) through the tool library.

The statement above is provided for part of embodiments, and the disclosure is not limited to retrieving the process-related information through the operating system hooks or Microsoft's Tool Help Library. Any program or operation capable of retrieving information about all running processes is within the scope of the disclosure.

The anomaly detection device 100 includes a processor 110, a storage medium 120, and a communication interface 140. The processor 110 is respectively connected to the storage medium 120 and the communication interface 140.

The processor 110 may be but not limited to a Digital Signal Processor (DSP), an Application Specific Integrated Circuit (ASIC), a Central Processing Unit (CPU), a System on Chip (SoC), a Field Programmable Gate Array (FPGA), a Network Processor IC, or the combination of the components above.

The storage medium 120 is configured to store the process relationship table 124, a prevalence model 126, and multiple program codes.

The process relationship table 124 is configured to store all history information about each created process of the anomaly detection device 100. When detecting that one process is created, the anomaly detection device 100 updates the contents of the process relationship table 124, that is, stores the history of the created process to the process relationship table 124.

The prevalence model 126 is configured to store multiple N-gram subject tuples and a prevalence value of each of the N-gram subject tuples. The anomaly detection device 100 of the disclosure inquires the prevalence model 126 to determine whether a creation of a process belongs to an anomaly event. Details of the technical content regarding the prevalence model 126 are explained in the following.

The multiple program codes are computer programmable codes and may be stored in the storage medium 120 in the form of a program (not shown in graphs). When the multiple program codes are provided to the processor 110, the processor 110 executes the multiple program codes to perform an anomaly detection method of the disclosure. Particularly, in an embodiment, the anomaly detection device 100 may execute the program after being switched on, continuously monitor the running processes in the background through the program, update the process relationship table 124, and determine whether the creation of processes is abnormal.

The storage medium 120 may be but not limited to a Random Access Memory (RAM), a nonvolatile memory (such as flash memory), a Read-Only Memory (ROM), a Hard Disk Drive (HDD), a Solid-State Drive (SSD), an Optical Storage, or the combination of the components above.

The communication interface 140 is configured to communicate with other devices (such as IoT devices) and perform normal function operations. The communication interface 140 may be but not limited to communication chips for wireless or wired networks, communication ports connected to other electronic devices (such as Industrial 4.0 technology), or combinations of the above components.

[First Embodiment of the Anomaly Detection Method]

Figure 2:
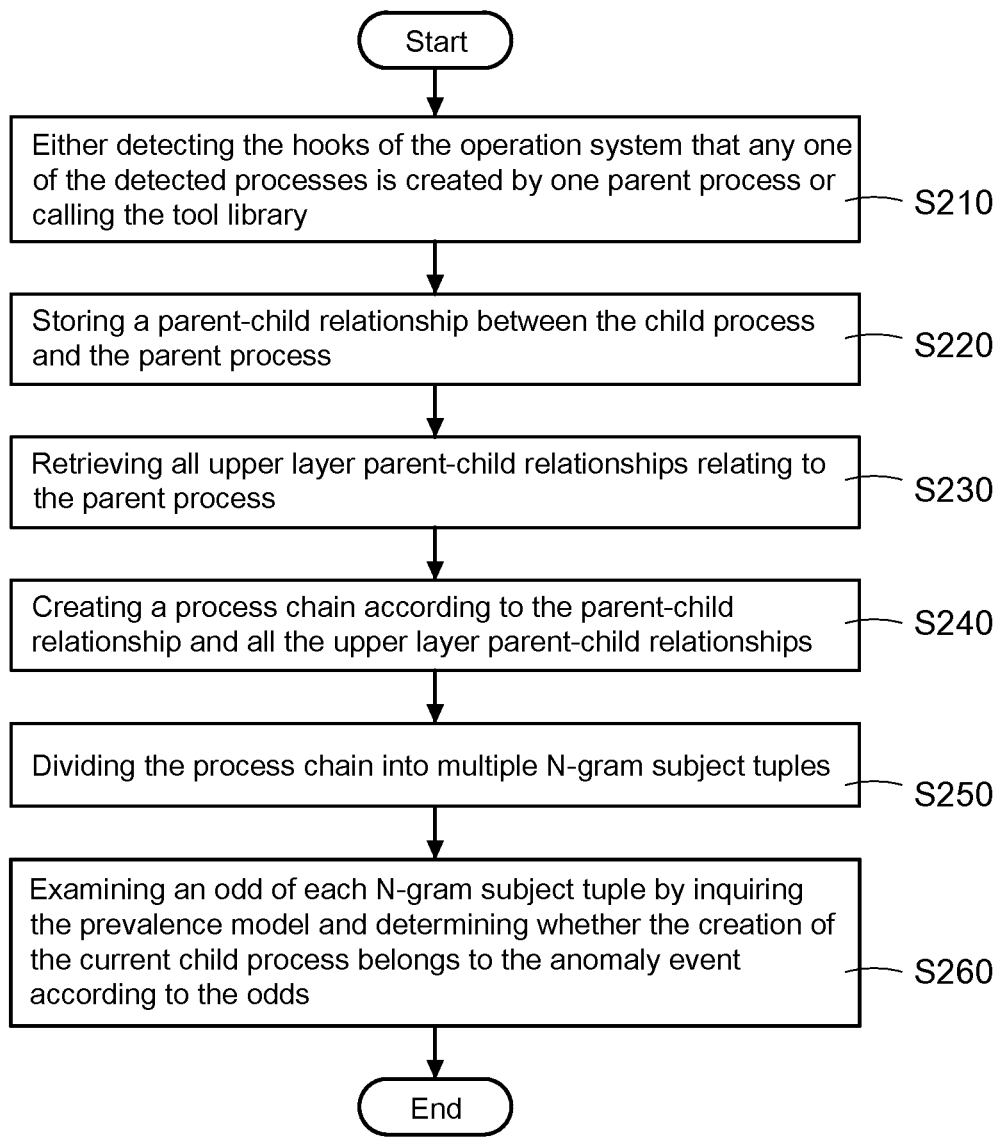
FIG. 2 is a flowchart of an anomaly detection method according to an embodiment of the disclosure.

FIG. 2 is a flowchart of an anomaly detection method according to an embodiment of the disclosure. The anomaly detection method of the disclosure is performed by the anomaly detection device 100 in FIG. 1, to determine whether a behavior of any process created in the operation system belongs to the anomaly event (anomaly behavior). For the sake of understanding the anomaly detection technology of the disclosure, the following description of each step of the anomaly detection method is provided and incorporated with the anomaly detection device 100. In the first embodiment, the anomaly detection method includes steps S210 to S260 detailed stated below.

In step S210, the anomaly detection device 100 either detects the hooks of the operation system that any one of processes (or called "detected processes") is created by one parent process or calls the tool library.

In this disclosure, the related execution information of every process is stored in the hook of the operation system or the tool library. The hook of the operation system indicates the time point that any child process is created by its parent process or called in the operation system. The anomaly detection device 100 gets a handle on the process creation by applying the hook of the operation system.

In the case that a first process is created or called by a second process, the second process is called the "parent process" and the first process is called the "child process".

In step S220, the anomaly detection device 100 stored a parent-child relationship upon a process creation between the child process being created and its parent process that creates the child process upon the hook of the operation system, or retrieves/stores the parent-child relationship between the child process and its parent process by calling tool library functions.

The anomaly detection device 100 detects the hook of the operation system or calls the tool library functions to retrieve and store the information related to the creation of each process, such as the name of the child process (i.e., the currently created process), the name of the parent process that creates the child process, and the parent-child relationship between the parent process and the child process.

In step S230, the anomaly detection device 100 retrieves all upper layer parent-child relationships relating to the parent process.

In the prior step (step S220), the anomaly detection device 100 has the information about the parent process that creates the other process, where the parent process is also created by another parent process that is upper than it (i.e., the another parent process is created earlier than the child process). In step S230, the anomaly detection device 100 searches for the relationships between all the parent processes related to the process and the relationships among the parent processes. For the sake of expression, the term "upper layer parent-child relationship" indicates all the process creation relationships tracing from the current parent process to the source process (such as the first process to be called of the operation system); the term "upper layer process" in the disclosure indicates all the processes counting from the source process to the process that created the parent process.

In steps S220 and S230, the anomaly detection device 100 retrieves the child process currently created, the parent process that creates the child process, the parent-child relationship, all the upper layer processes related to the parent process, and all the upper layer parent-child relationships among these upper later processes. For example, when detecting that the first process (child process) is created by the second process (parent process) in step S210, the anomaly detection device 100 stores the parent-child relationship between the first process and the second process in step S220. Among the steps, the second process is created by a third process, and the third process is created by a fourth process. Therefore, the anomaly detection device 100 regards the third process and the fourth process as the upper layer processes related to the second process and retrieves all the upper layer parent-child relationships related to the second process (including the parent-child relationship between the second process and the third process and the parent-child relationship between the third process and the fourth process) in step S230.

In step S240, the anomaly detection device 100 creates a process chain according to the stored parent-child relationship in step S220 and all the retrieved upper layer parent-child relationships in step S230.

The process chain indicates a continuous relationship formed by the currently created child process, the parent process that created the child process, and all the upper layer processes related to the parent process in accordance with the parent-child relationship and the upper layer parent-child relationships. The process chain may be used to represent the creation relationship, from the source process to the recently created child process, containing processes having mutual relationships.

In step S250, the anomaly detection device 100 divides the process chain into multiple N-gram subject tuples, where the amount of the multiple N-gram subject tuples is M. The multiple N-gram subject tuples include the process relationship of N subjects, where N is a positive integer greater than or equal to 2 and M is a positive integer greater than or equal to 1. Taking an example that the length of the process chain is 5 and a 2-gram subject tuple is applied. In this case, the anomaly detection device 100 divides the process chain into four subjects (i.e., M equals to 4). Taking another example that the length of the process chain is 5 and a 3-gram subject tuple is applied, the anomaly detection device 100 divides the process chain into 3 subjects (i.e., M equals to 3).

In an embodiment, the anomaly detection device 100 applies an N-Gram Language Model of Natural Language Processing (NLP) to divide the process chain.

The example below considers the situation that N is a positive integer 2 (i.e., using the 2-gram subject tuple), and the content of the process chain includes five processes which are [A1.exe, A2.exe, A3.exe, A4.exe, A5.exe]. In this case, the process chain is divided into four 2-gram subject tuples (i.e., M equals to four), which are [A1.exe, A2.exe], [A2.exe, A3.exe], [A3.exe, A4.exe], and [A4.exe, A5.exe], where each 2-gram subject tuple includes the process relationship between two subjects. For example, the 2-gram subject tuple [A1.exe, A2.exe] indicates the process relationship between the subject A1.exe and the subject A2.exe, the 2-gram subject tuple [A2.exe, A3.exe] indicates the process relationship between the subject A2.exe and the subject A3.exe, and the like.

In step S260, the anomaly detection device 100 examines an odd of each divided N-gram subject tuple that is obtained by dividing the process chain by inquiring the prevalence model 126 and determines whether the creation of the current child process belongs to the anomaly event according to the odds.

When at least one of the odds does not match a normal value after examining the odds of all the N-gram subject tuples, the anomaly detection device 100 determines that the anomaly event occurs and further confirms that the anomaly event occurs at the N-gram subject tuple(s) having the abnormal odd(s).

Following the example of four 2-gram subject tuples mentioned above, the anomaly detection device 100 respectively searches for each of the 2-gram subject tuples [A1.exe, A2.exe], [A2.exe, A3.exe], [A3.exe, A4.exe], and [A4.exe, A5.exe] in the prevalence model 126 and obtains that the prevalence values of these 2-gram subject tuples are 2, 5, 0, and 2 respectively. In an embodiment, the anomaly detection device 100 regards these prevalence values obtained from the prevalence model 126 as the odds of the 2-gram subject tuples [A1.exe, A2.exe], [A2.exe, A3.exe], [A3.exe, A4.exe], and [A4.exe, A5.exe].

In an embodiment, the anomaly detection device 100 sets a normal condition as the value being greater than 0. In the above embodiment, the odd of the 2-gram subject tuple [A3.exe, A4.exe] is 0, which is abnormal. Therefore, the anomaly detection device 100 determines that the anomaly event exists, and the anomaly event occurs at the 2-gram subject tuple [A3.exe, A4.exe].

[The Second Embodiment of the Anomaly Detection Method]

Figure 3:
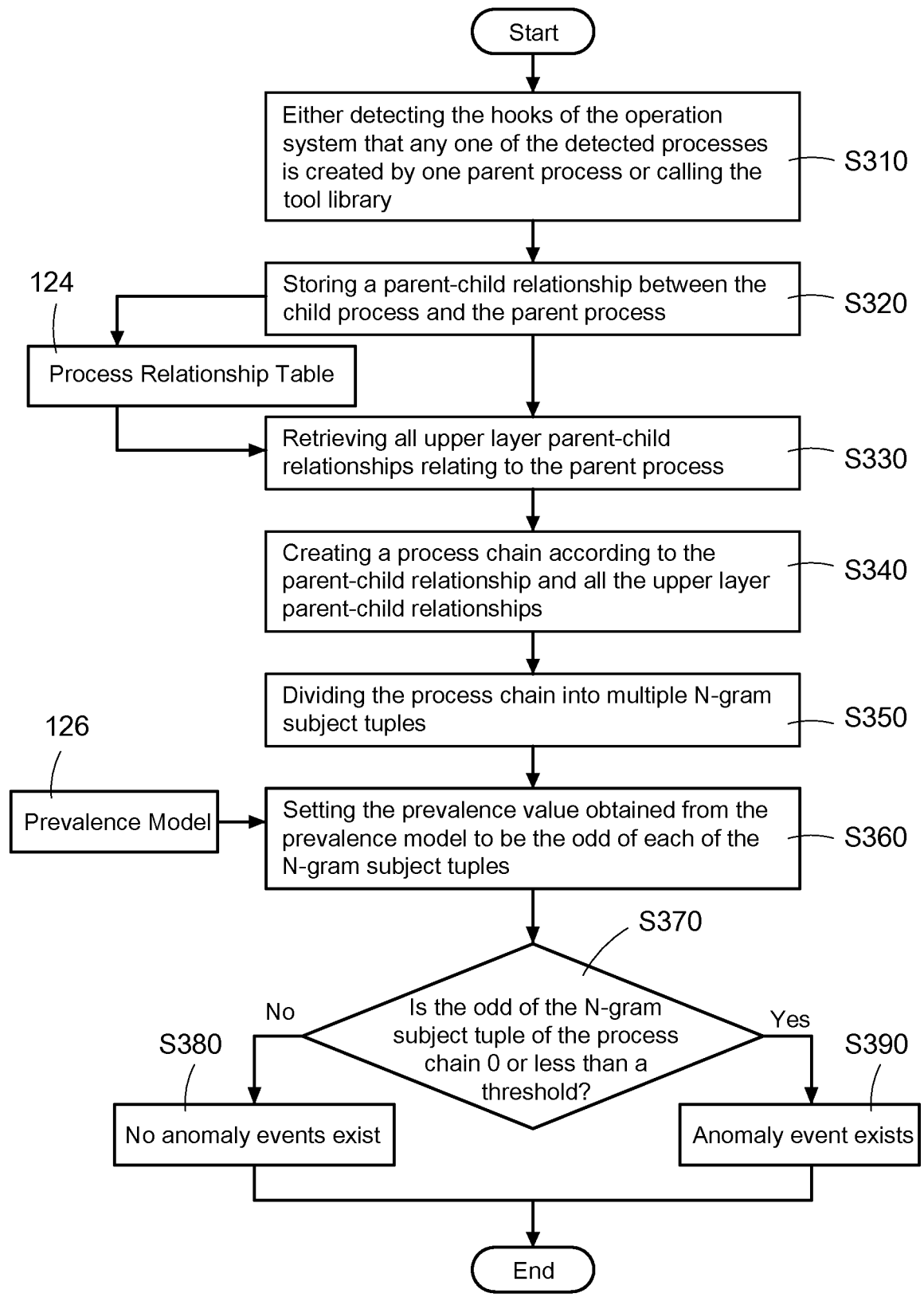
FIG. 3 is a flowchart of the anomaly detection method according to an embodiment of the disclosure.

FIG. 3 is a flowchart of the anomaly detection method according to an embodiment of the disclosure. For the sake of understanding the anomaly detection technique of the disclosure, the statement of each step of the anomaly detection method below is incorporated with the anomaly detection device 100 in FIG. 1.

In the second embodiment, the anomaly detection method includes steps S310 to S390. Compared with the first embodiment in FIG. 2, the second embodiment further explains the details of applying the process relationship table 124 and the prevalence model 126. In some cases, the content of steps S310 to S350 may refer to steps S210 to S250. For the sake of brevity, the referred statement is not repeated herein.

[The Embodiment of the Process Relationship Table]

The anomaly detection device 100 detects continuously the hook of the operation system or calls the tool library functions by performing the anomaly detection method in the background to obtain the parent-child relationship between the created child process and its parent process and store the parent-child relationship to the process relationship table 124 (step S320). In the case that the parent process is not the source process, the process relationship table 124 stores the history (such as the name of the other parent process that created the parent process) related to the creation of the parent process. The anomaly detection device 100 retrieves the relationship between the parent process and the other parent process that created the parent process from the process relationship table 124 (step S330). By repeating the step, the anomaly detection device 100 obtains all the upper layer parent-child relationships related to the parent process from the process relationship table 124 until reaches the source process (step S330).

The statement "repeating the step" indicates that the anomaly detection device 100 obtains the parent-child relationship between the parent process and a superior parent process when the parent process has the superior parent process (i.e., the parent process is not the source process in this case). When the superior process has the other superior process (i.e., the superior process is not the source process), the anomaly detection device 100 retrieves the upper layer parent-child relationship between the superior parent and the other superior parent process from the process relationship table 124 again. The rest is done in the same manner until the source process is traced.

The parent-child relationship and all the upper layer parent-child relationships obtained in steps S320 and S330 include the information (such as the process name and the process-created order) about the creation of each process. The anomaly detection device 100 creates the process chain according to the parent-child relationship and all the upper layer parent-child relationships (step S340). In the case that the length of the process chain is K (i.e., the process chain includes K processes, where K is a positive integer greater than or equal to 1), the anomaly detection device 100 divides the process chain based on the selected N value into M N-gram subject tuples. For example, if the length K of the process chain is 6 and the selected N value is 3, the process chain is divided into four 3-gram subject tuples (the M value is 4 in this case).

To confirm whether the creation behavior of each process of the process chain belongs to the normal event or the anomaly event, the anomaly detection device 100 uses the prevalence model 126 to perform the determinations.

[The Embodiment of the Prevalence Model]

As mentioned above, the process chain related to the currently created child process is divided into the M N-gram subject tuples by the anomaly detection device 100 in step S350. The anomaly detection device 100 takes each of the obtained M N-gram subject tuples as an index to search the prevalence model 126.

In this disclosure, the prevalence model 126 is established based on the history creation information of each process of the anomaly detection device 100, and the contents of the prevalence model 126 include multiple N-gram subject tuples and the prevalence value of each of the N-gram subject tuples. In an embodiment, the anomaly detection device 100 searches the prevalence model 126 by the index as which each of the N-gram subject tuples is taken, obtains the prevalence value of each of the N-gram subject tuples from the prevalence model 126, and respectively sets the prevalence value of each of the N-gram subject tuples as the odd of each of the N-gram subject tuples (step S360).

In an embodiment, the anomaly detection device 100 examines one by one whether the odd of each of the N-gram subject tuples of the process chain is 0 or less than a threshold (step S370). When the odds of all the N-gram subject tuples are not 0 or greater than the threshold, the anomaly detection device 100 determines that no anomaly event exists (step S380). When the odd of any one of the N-gram subject tuples is 0 or less than the threshold, the anomaly detection device 100 determines the anomaly event exists (step S390). The anomaly event includes an abnormal process creation activity.

[The Embodiment of a Learning Mode]

Figure 4:
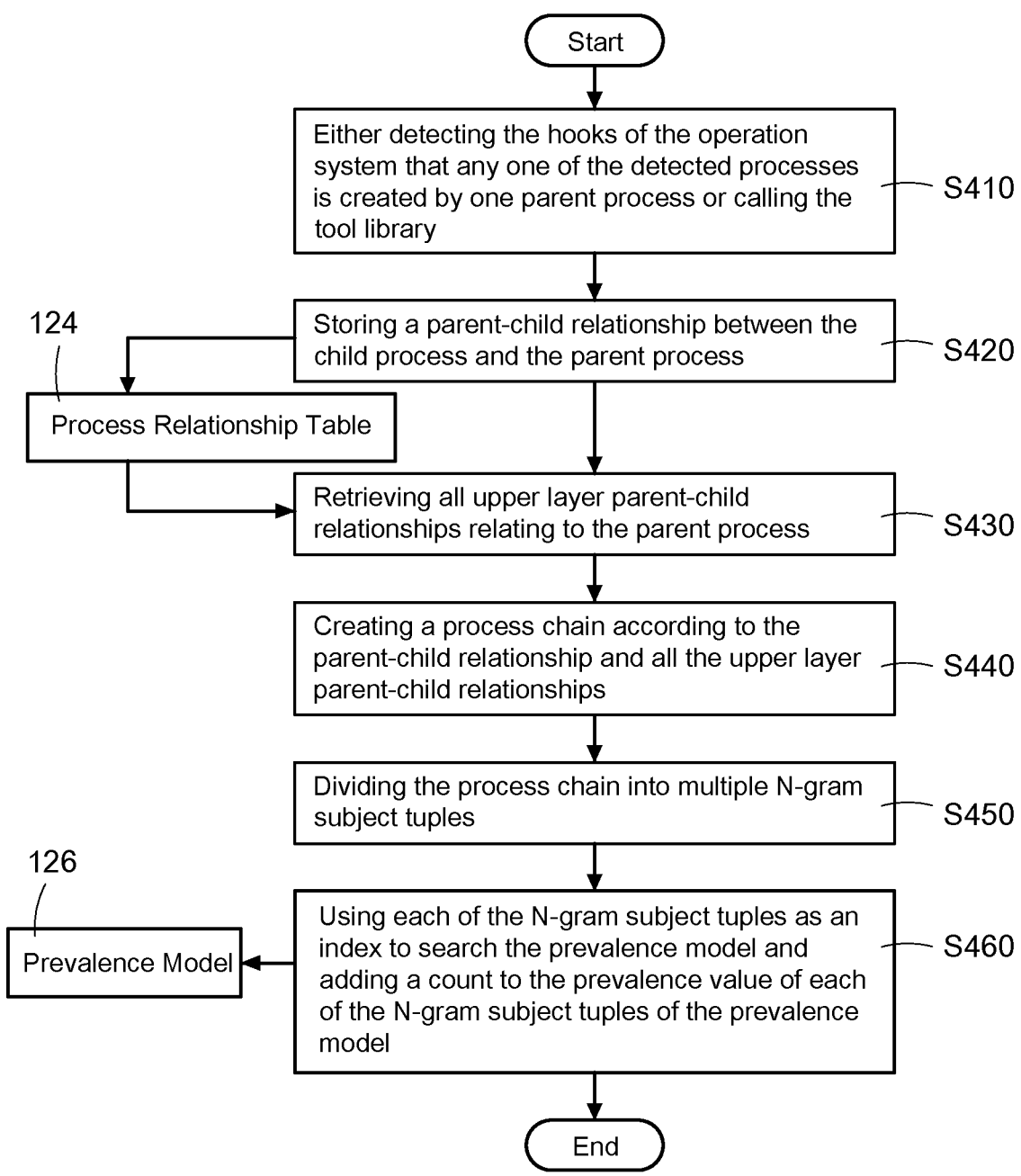
FIG. 4 is a flowchart of learning steps being performed in a learning mode according to an embodiment of the disclosure.

FIG. 4 is a flowchart of learning steps being performed in a learning mode according to an embodiment of the disclosure. In the embodiments provided in FIG. 2 and FIG. 3, the anomaly detection device 100 may operate in the detection mode to determine, by performing the anomaly detection method in the background, whether the current process creation event belongs to the anomaly event. On the contrary, FIG. 4 illustrates the technique features of the anomaly detection device 100 performing in the learning mode. The anomaly detection device 100 detects, in the learning mode, the hooks of the operating system or calls the tool library functions to create a new prevalence model 126 or update an existing prevalence model 126.

In an embodiment, the anomaly detection method being performed in the learning mode includes steps S410 to S460. Compared with the embodiments illustrated in FIG. 3, the embodiments illustrated in FIG. 4 further provide a mechanism of updating the prevalence model 126. The mechanism is explained by steps performed by the anomaly detection device 100 in the learning mode.

It should be noted that explanations of steps S410 to S450 are similar to steps S310 to S350 or may be inferred from/induced by steps S310 to S350. In other words, in both the detection mode and the learning mode, the anomaly detection device 100 performs the anomaly detection method in the background to detect all the process creation activities, create the process chain according to the process relationships stored in the process relationship table 124, and divide the process chain into the M N-gram subject tuples.

For the sake of brevity, the statements of steps S410 to S450 may be referred to related statements of steps S310 to S350, detailed description is omitted here.

In step S460, the anomaly detection device 100 uses each of the N-gram subject tuples obtained by dividing the process chain in step S450 as the index to search the prevalence model 126 and respectively adds a count to the prevalence value of each of the N-gram subject tuples of the prevalence model 126 when the N-gram subject tuple corresponding to the index is found in the prevalence model 126.

The following is an example of the process chain whose content is [A1.exe, A2.exe, A3.exe, A4.exe, A5.exe], and the process chain is divided into four 2-gram subject tuples including [A1.exe, A2.exe], [A2.exe, A3.exe], [A3.exe, A4.exe], and [A4.exe, A5.exe]. Supposed that the data stored in the prevalence model 126 includes the 2-gram subject tuples [A2.exe, A3.exe], [A3.exe, A4.exe], and [A4.exe, A5.exe] and their prevalence values are 1, 3, and 2 respectively before the prevalence model 126 is updated in the learning mode is considered. The anomaly detection device 100 respectively adds the counts to the prevalence values of the 2-gram subject tuples [A1.exe, A2.exe], [A2.exe, A3.exe], [A3.exe, A4.exe], [A4.exe, A5.exe] in the prevalence model 126 (such as adding a value '1') and obtains the updated prevalence values 1, 2, 4, and 3 respectively after the learning model 126 is updated in the learning mode. In this embodiment, before updating the prevalence model 126, the anomaly detection device 100 had not updated the prevalence value of the 2-gram subject tuple [A1.exe, A2.exe] of the prevalence model 126, so the prevalence value of the 2-gram subject tuple [A1.exe, A2.exe] is counted from a default value '0' that may be not stored in the prevalence model 126 in default. After updating the prevalence model 126, the prevalence value of the 2-gram subject tuple of the prevalence model 126 is '1'.

In the embodiment of updating the prevalence model 126, not only the parent-child relationship between the current created child process and its parent process is applied to update the prevalence model 126, that is, the prevalence value of one of the N-gram subject tuples, but also all the parent-child relationships and the upper layer parent-child relationships related to the current created child process are applied to update the prevalence value of each of the N-gram subject tuples of the prevalence model 126.

[Timing of Updating the Prevalence Model]

In the initial state, the prevalence model 126 is an empty model without any data. When executing the anomaly detection method in the initial state, the anomaly detection device 100 automatically updates the prevalence model 126 in the learning mode.

In the learning mode, the anomaly detection device 100 performs steps S410 to S460 in FIG. 4 to update the prevalence model 126. The anomaly detection device 100 automatically or manually switches from the learning mode to the detection mode when the prevalence model 126 has been updated to a certain level. Next, the anomaly detection device 100 detects the anomaly event in the detection mode (such as steps S210 to S260 of FIG. 2 and steps S310 to S390 of FIG. 3). The certain level of updating includes a total quantity of the N-gram subject tuples whose prevalence values are not 0, an updating quantity of the N-gram subject tuples whose prevalence values are not 0 in continuously updating procedure (e.g., the N-gram subject tuples divided from multiple continuous process chains are already stored in the prevalence model 126, so the updating quantity is the encounter times that the N-gram subject tuples whose prevalence values are not 0 in the prevalence model 126), and a determination accuracy of the anomaly event occurring.

In some situations, the operation system executes normal process creation activity, though the relationships among these created processes are not updated to the prevalence model 126. In this case, the situation may result in continuous misjudgment of the anomaly events. At this time, the anomaly detection device 100 may switch from the detection mode to the learning mode to quickly update the prevalence model 126 according to the updating level (such as the determination accuracy of the anomaly events occurring) and then switch back to the detection mode from the learning mode to continue the detection of the anomaly events.

[Embodiment of a Graphical Illustration]

Figure 5:
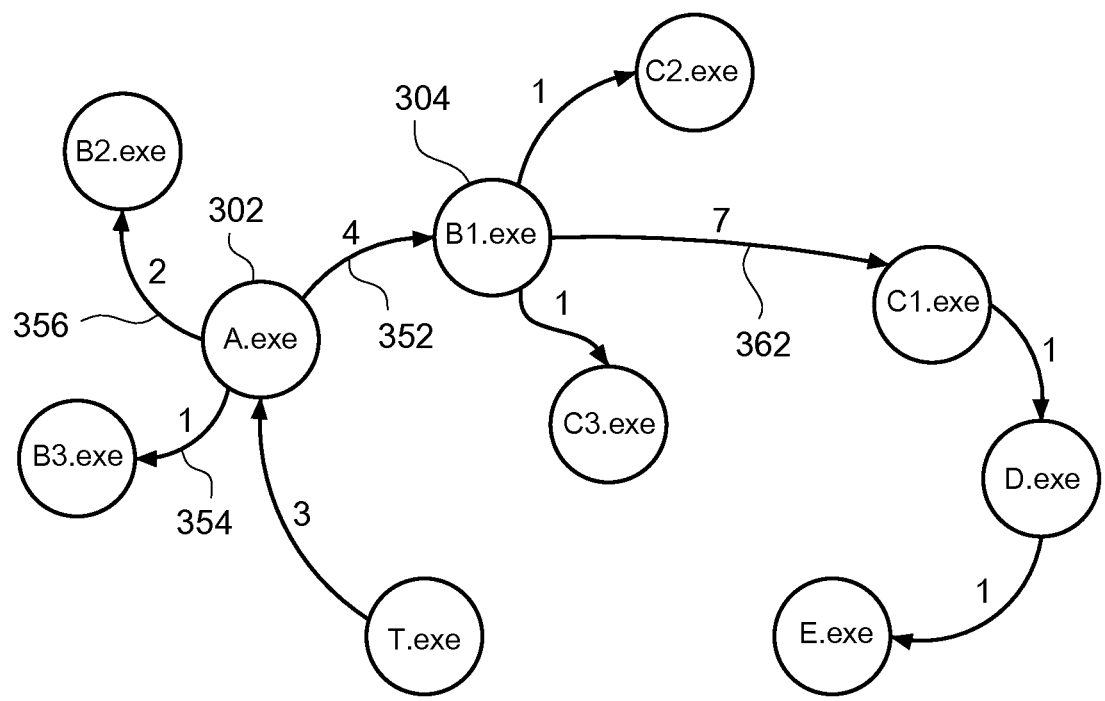
FIG. 5 is a schematic diagram of creating a directed graph based on a relationship that processes are created according to an embodiment of the disclosure.

FIG. 5 is a schematic diagram of creating a directed graph based on a relationship that processes are created according to an embodiment of the disclosure. The anomaly detection device 100 creates and updates the prevalence model 126 based on steps of FIG. 4, and the content of the prevalence model 126 may be illustrated in the graphical form of the directed graph in FIG. 5.

In FIG. 5, a node indicates one process and an edge between two nodes indicates the process creation relationship (or called the "parent-child relationship") between the two nodes. For example, the node 302 (A.exe) is created by the node 304 (B1.exe). In this relationship, the node 302 is the child process, and the node 304 is the parent process. It should be noted that each process may play the role of the child process, the parent process, or both the child process and the parent process at the same time, and it depends on actual situations.

In the embodiment of the detection mode, the anomaly detection device 100 performs steps S310 to S360 in FIG. 3 to obtain the multiple process chains and the odds of each of the N-gram subject tuples of each process chain, and these process chains are drawn in the form of the directed graph in FIG. 5. By the graphical illustration, it is easy for the user to observe the creation relationships among the processes and to manage the entire operations.

In the other embodiments, the directed graph in FIG. 5 is provided for the user to understand the prevalence model 126 more easily, and the anomaly detection device 100 and the anomaly detection method may create the directed graph as an option feature in the disclosure.

The process chain [A.exe, B1.exe, C1.exe] is taken as one example and the following statements are incorporated with the prevalence model 126 in FIG. 5. After obtaining the process chain [A.exe, B1.exe, C1.exe], the anomaly detection device 100 divides the process chain into two 2-gram subject tuples including [A.exe, B1.exe] and [B1.exe, C1.exe] if N is set to be 2. The anomaly detection device 100 utilizes the two 2-gram subject tuples to inquire the prevalence model 126 (such as TABLE 1 disclosed below) to obtain a prevalence value of one of the two 2-gram subject tuples [A.exe, B1.exe] which is 4 and a prevalence value of another one of the two 2-gram subject tuples [B1.exe, C1.exe] which is 7.

The anomaly detection device 100 sets the prevalence values obtained above as the odds of the two 2-gram subject tuples [A.exe, B1.exe] and [B1.exe, C1.exe] and tags on directed edges 352 and 362 of the directed graph. As shown in FIG. 5, the value of the directed edge 352 is 4 and the value of the directed edge 362 is 7. In this embodiment, the value, 4, of the directed edge 352 represents that the process A.exe is called by the process B.exe four times, and the value, 7, of the directed edge 362 represents that the process B1.exe is called by the process C1.exe seven times.

TABLE 1

| prevalence model (taking 2-gram subject tuples as one example) | | | |
|---|---|---|---|
| Child Process | Parent Process | 2-Gram Subject Tuples | Prevalence Value |
| D.exe | E.exe | [D.exe, E.exe] | 1 |
| C1.exe | D.exe | [C1.exe, D.exe] | 1 |
| B1.exe | C1.exe | [B1.exe, C1.exe] | 7 |
|  | C2.exe | [B1.exe, C2.exe] | 1 |
|  | C3.exe | [B1.exe, C3.exe] | 1 |
| A.exe | B1.exe | [A.exe, B1.exe] | 4 |
|  | B2.exe | [A.exe, B2.exe] | 2 |
|  | B3.exe | [A.exe, B3.exe] | 1 |
| T.exe | A.exe | [T.exe, A.exe] | 3 |

The default value of the prevalence value is 0 when the N-gram subject tuple is not stored in the prevalence model 126. It should be noted that the default value of the prevalence value of the N-gram subject tuple that is not stored in the prevalence model 126 may be set according to the actual situation, and the default value is not limited to 0.

In the embodiment of the learning mode, the anomaly detection device 100 performs steps S410 to S460 in FIG. 4 to obtain the multiple process chains, divides these process chains to update the prevalence value of each of the N-gram subject tuples in the prevalence model 126 and draw the directed graph as shown in FIG. 5.

The process chain [A.exe, B1.exe, C1.exe] is taken as one example and the following statements are incorporated with the prevalence model 126 in FIG. 5. After obtaining the process chain [A.exe, B1.exe, C1.exe], the anomaly detection device 100 divides the process chain into two 2-gram subject tuples including [A.exe, B1.exe] and [B1.exe, C1.exe] if N is set to be 2. The anomaly detection device 100 uses the two 2-gram subject tuples as the indices to search the prevalence model 126 (TABLE 1) respectively to obtain the prevalence value of the 2-gram subject tuple [A.exe, B1.exe], i.e., 4, and the prevalence value of the 2-gram subject tuple [B1.exe, C1.exe], i.e., 7.

In the learning mode, the anomaly detection device 100 respectively adds the count of the prevalence value to the two 2-gram subject tuples of the prevalence model 126. For example, the prevalence value of the 2-gram subject tuple [A.exe, B1.exe] is added to the value 5 (from the value 4) and the prevalence value of the 2-gram subject tuple [B1.exe, C1.exe] is added to the value 8 (from the value 7).

In an embodiment, after switching back from the learning mode to the detection mode, the anomaly detection device 100 performs steps in FIG. 3 again. When the anomaly detection device 100 takes the two 2-gram subject tuples [A.exe, B1.exe] and [B1.exe, C1.exe] as the indices to search the prevalence model 126, the values 5 and 8 are obtained as the odds of the two 2-gram subject tuples [A.exe, B1.exe] and [B1.exe, C1.exe].

In an embodiment, the prevalence value of each of the N-gram subject tuples may be obtained by linear functions or non-linear functions, and algorithms for computing the prevalence values are not limited herein.

[Embodiments of Determination Criteria of the Anomaly Event]

As the embodiments described above in FIG. 3, the anomaly detection device 100 sets the prevalence values obtained from the prevalence model 126 as the odds of each of the N-gram subject tuples of the current process chain and then in steps S370 determines whether the anomaly event exists based on the odds which are 0 or not of these N-gram subject tuples.

Figure 6:
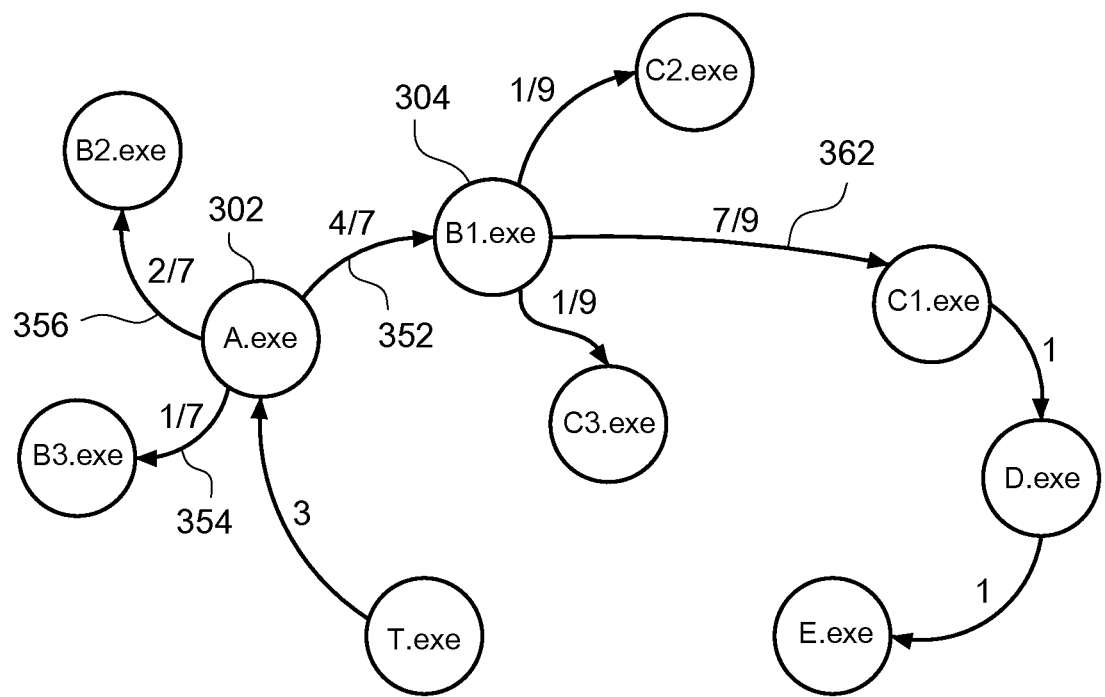
FIG. 6 is a schematic diagram of creating the directed graph based on the relationship that the processes are created according to the other embodiment of the disclosure.

In the other embodiment, the anomaly detection device 100 computes multiple ratios according to the counts that same process is created by different parent processes and uses the ratios to determine the occurrence of the anomaly event. To describe the computation of the ratios, the statements below are incorporated with FIG. 5 and FIG. 6. FIG. 6 is a schematic diagram of creating the directed graph based on the relationship that the processes are created according to the other embodiment of the disclosure.

It can be seen from the directed edge 352 (with value 4), the directed edge 354 (with the value 1), and the directed edge 356 (with the value 1) in FIG. 5 that the process A.exe is called by the process B1.exe four times, called by the process B2.exe two times, and called by the process B3.exe one time. Statistically, the process A.exe is called (created) by three different parent processes seven times in total.

In the embodiment, the anomaly detection device 100 computes the ratio that the process A.exe is created by the process B1.exe to obtain the ratio 4/7, created by the process B2.exe to obtain the ratio 2/7, and created by the process B3.exe to obtain the ratio 1/7. In the embodiment, the ratio is called a "creation ratio".

In the embodiment with FIG. 6, the value of the directed edge 352 is 4/7, the value of the directed edge 356 is 2/7, and the value of the directed edge 354 is 1/7. In this embodiment, the anomaly detection device 100 uses the creation ratios as the odds (i.e., the creation ratios are stored in the prevalence model 126 to be the prevalence value of each of the N-gram subject tuples). When the odds of one of the N-gram subject tuples is greater than a default threshold (e.g., 1/7 or 1/10), the anomaly detection device 100 determines that the anomaly event does not exist.

In the determination of the anomaly event occurrence, it is easier for the user to set the default threshold by the adoption of the creation ratio.

[The Other Embodiments of the N-Gram Subject Tuples]

As mentioned above, the prevalence model 126 includes the multiple N-gram subject tuples and the prevalence value corresponding to each N-gram subject tuple stored in the learning mode. The user may set the N value based on the actual situation. In other words, the user may decide whether to divide the process chain by 2-gram subject tuples, 3-gram subject tuples, 4-gram subject tuples, . . . , or N-gram subject tuples to perform the determination of the anomaly event occurrence. It should be noted that the anomaly detection device 100 may keep the N value used in the detection mode consistent with the N value used in the learning mode, so the odds of each of the N-gram subject tuples obtained from the prevalence model 126 keep consistent criteria.

[Embodiments of the Learning Mode and the Detection Mode]

In an embodiment, the learning mode and the detection mode may be performed separately, interchangeably, partially interleaved, or one after the other repeatedly.

In an embodiment, the anomaly detection device 100 may store multiple prevalence models 126. The situation that the anomaly detection device 100 creates the prevalence model 126 that may be searchable in the learning mode, and implements the anomaly event detection in the detection mode. In the detection mode, after determining that the anomaly event exists, the anomaly detection device 100 stores the detected anomaly event to the other prevalence model (not shown in figures). Therefore, the user may inspect the content of the other prevalence model to estimate how to update the original prevalence model 126 by the information of the anomaly event.

In the other embodiment, the anomaly detection device 100 adds the process chain that is determined to be the anomaly event into the well-trained prevalence model 126 to optimize the prevalence model 126; therefore, an event originally determined to be abnormal will no longer be determined as abnormal anymore due to the optimized prevalence model 126.

In an embodiment, the anomaly detection device 100 provides a user interface (not shown in the figure). The user interface is configured to receive one or more N-gram subject tuples and the prevalence value of each N-gram subject tuple which are inputted by the user. In this embodiment, the anomaly detection device 100 receives the contents of the multiple N-gram subject tuples (including the subjects of each N-gram subject tuple and the prevalence values) by the user interface to be default configurations. In this embodiment, the user may directly set the relationship between any known processes in the anomaly detection device 100, so the anomaly detection device 100 finishes the creation of the prevalence model 126 and is unnecessary to perform the anomaly detection method in the learning mode for the creation of the prevalence model 126.

[Embodiment of Computer-Readable Storage Medium]

In an embodiment, the anomaly detection method may be implemented in the form of a computer program which is stored in the computer-readable storage medium (not shown in figures). In an embodiment, the computer-readable storage medium may be the storage medium 120 of the anomaly detection device 100. The anomaly detection device 100 accesses the storage medium and executes the computer program to implement the anomaly detection method mentioned above (such as steps S210 to S260 in FIG. 2, steps S310 to S390 in FIG. 3, and steps S410 to S460 in FIG. 4).

Accordingly, the anomaly detection device and the anomaly detection method provided in the disclosure relate to analyzing the creation relationships among the processes, storing the creation relationships in the process relationship table, and using the multiple N-gram subject tuples and the prevalence values of the prevalence model to determine whether the current process creation activity belongs to the normal event or the anomaly event. In addition to getting the information about the anomaly event, the anomaly detection technique may get the information about the process that induces the anomaly event. Therefore, the disclosure provides the rapid detection of anomaly events without parsing a large number of log files to improve the efficiency of identifying abnormal events, quickly takes corresponding measures in response to anomaly processes, and saves computational resources.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An anomaly detection method executed by an anomaly detection device running an operating system, performed in a detection mode of the anomaly detection device and comprising steps of:
   (a) storing a parent-child relationship to a process relationship table upon a process creation;
   (b) retrieving all upper layer parent-child relationships relating to a parent process from the process relationship table;
   (c) creating a process chain according to the parent-child relationship and all of the upper layer parent-child relationships relating to the parent process;
   (d) dividing the process chain into M N-gram subject tuples, wherein each of the N-gram subject tuples comprises a process relationship of N subjects, N is a positive integer that is greater than or equal to 2, and M is a positive integer that is greater than or equal to 1; and
   (e) examining an odd of each of the N-gram subject tuples by inquiring a prevalence model and determining whether a creation of a process belongs to an anomaly event according to the odds, wherein the prevalence model stores the M N-subject tuples and a prevalence value of each of the N-subject tuples,
   wherein step (b) further comprises:
   (b1) retrieving the upper layer parent-child relationship between the parent process and a superior parent process of the parent process in the process relationship table when the patent process has its superior parent process;
   (b2) retrieving the upper layer parent-child relationship between the superior parent process and other superior parent process in the process relationship table when the superior parent process has the other superior parent process; and
   (b3) repeating step (b2) until the superior parent process does not have the other superior parent process to retrieve all the upper layer parent-child process relationships.

2. The anomaly detection method of claim 1, wherein step (e) further comprises:
   (e1) inquiring the prevalence model by using each of the N-gram subject tuples as an index to obtain the prevalence value of each of the N-gram subject tuples and applying the prevalence value as the odd;
   (e2) determining that the anomaly event exists when the odd of any one of the N-gram subject tuples is zero or less than a threshold; and
   (e3) determining that the anomaly event does not exist when the odds of all the N-gram subject tuples are not zero or greater than the threshold.

3. The anomaly detection method of claim 1, further comprising following steps in a learning mode of the anomaly detection device:
   (f) executing steps (a) to (d); and
   (g) inquiring the prevalence model by using each of the N-gram subject tuples as an index to obtain the prevalence value of each of the N-gram subject tuples and respectively adding a count to the prevalence value of each of the N-gram subject tuples of the prevalence model.

4. An anomaly detection device, comprising:
   a non-transitory storage medium configured to store multiple program codes; and
   a processor connected to the non-transitory storage medium and configured to load and execute the multiple program codes to perform operations comprising:
   (a) storing a parent-child relationship to a process relationship table upon a process creation;
   (b) retrieving all upper layer parent-child relationships relating to a parent process from the process relationship table;
   (c) creating a process chain according to the parent-child relationship and all of the upper layer parent-child relationships relating to the parent process;
   (d) dividing the process chain into M N-gram subject tuples, wherein each of the N-gram subject tuples comprises a process relationship of N subjects, N is a positive integer that is greater than or equal to 2, and M is a positive integer that is greater than or equal to 1; and
   (e) examining an odd of each of the N-gram subject tuples by inquiring a prevalence model and determining whether a creation of a process belongs to an anomaly event according to the odds, wherein the prevalence model stores the M N-subject tuples and a prevalence value of each of the N-subject tuples,
   wherein the processor is configured to perform following operations when performing operation (b):
   (b1) retrieving the upper layer parent-child relationship between the parent process and a superior parent process of the parent process in the process relationship table when the patent process has its superior parent process;

(b2) retrieving the upper layer parent-child relationship between the superior parent process and other superior parent process in the process relationship table when the superior parent process has the other superior parent process; and (b3) repeating operation (b2) until the superior parent process does not have the other superior parent process to retrieve all the upper layer parent-child process relationship.

5. The anomaly detection device of claim 4, wherein the processor is configured to perform following operations when performing operation (e):

(e1) inquiring the prevalence model by using each of the N-gram subject tuples as an index to obtain the prevalence value of each of the N-gram subject tuples and applying the prevalence value as the odd;

(e2) determining that the anomaly event exists when the odd of any one of the N-gram subject tuples is zero or less than a threshold; and (e3) determining that the anomaly event does not exist when the odds of all the N-gram subject tuples are not zero or greater than the threshold.

6. The anomaly detection device of claim 4, wherein the processor is configured to further perform following operations in a learning mode:

(f) executing operations (a) to (d); and (g) inquiring the prevalence model by using each of the N-gram subject tuples as an index to obtain the prevalence value of each of the N-gram subject tuples and respectively adding a count to the prevalence value of each of the N-gram subject tuples of the prevalence model.

7. A non-transitory computer-readable storage medium storing multiple program codes, wherein the multiple program codes are loaded into a processor, the processor is configured to execute the multiple program codes to perform steps of the anomaly detection method of claim 1.

* * * * *